United States Patent [19]
Lin et al.

[11] Patent Number: 6,167,549
[45] Date of Patent: Dec. 26, 2000

[54] MEMORY ACCESS CONTROL DEVICE, AND ITS CONTROL METHOD

[75] Inventors: Chanson Lin; Joe Shyu, both of Hsinchu, Taiwan

[73] Assignee: Kye Technology Corporation, Hsinchu, Taiwan

[21] Appl. No.: 09/113,381

[22] Filed: Jul. 10, 1998

[51] Int. Cl.[7] .................................................. G06F 11/10
[52] U.S. Cl. ............................................................ 714/763
[58] Field of Search ..................................... 714/769, 763

[56] References Cited

U.S. PATENT DOCUMENTS 4,672,613  6/1987  Foxworthy et al. ....................... 371/38

*Primary Examiner*—Stephen M. Baker
*Attorney, Agent, or Firm*—Rosenberg, Klein & Lee

[57] ABSTRACT

A memory access control method which includes the step of using a data processor to subdivide a data sector into a plurality of data fields when storing data, then using an encoder to add a respective error correcting code to every data field, and then storing error correcting code encoded in a memory, and the step of decoding the respective error correcting code when reading data from the memory, then storing the decoded error correcting code in a recorder, and then controlling an error correcting logic circuit to compare the decoded error correcting code, and then controlling the data processor to correct the respective data field if the decoded error correcting code is denied after comparison or controlling the data processor to read the data for output if the decoded error correcting code is confirmed.

9 Claims, 4 Drawing Sheets

MEMORY ACCESS CONTROL DEVICE, AND ITS CONTROL METHOD

BACKGROUND OF THE INVENTION

The present invention relates to a memory access control method which to divides the data to be stored into a plurality of data fields by a cross-cut method, permitting every data field to be augmented with a respective error correcting code, so that incorrect data can be immediately checked for and corrected when reading. The method greatly improves data access reliability, and saves much data access time and memory space. The invention relates also to a hardware arrangement for the memory access control method.

It is well known that an error may occur when storing data or updating binary data, thereby causing an error message to be read out. When an error message is produced, the normal operation of data will be affected. In order to prevent the occurrence of incorrect data, an ECC (error-correcting code) is used. The ECC add an error correcting code (parity data) for every byte (or word) when storing data, permitting the error correcting code to be stored with the data in the memory. When fetching the data, the error correcting code is read out with the data, and the error correcting code is compared with check data of the fetched data. If the error correcting code is confirmed, the data is accepted for output. If the error correcting code is denied, a syndrome will be produced to recognize the incorrect data, enabling the incorrect data to be corrected. This method of using byte (or word) as a unit for augmented by an error correction code occupies much memory capacity, therefore it reduces the efficiency of the memory. Further, it wastes much time in checking every byte (or word), thereby causing the data operation speed to be reduced.

SUMMARY OF THE INVENTION

It is one object of the present invention to provide a data access control device which cross-cuts data into a plurality of data fields and adds an error correcting code to every data field, so that any error message can be quickly checked when fetching the data. It is another object of the present invention to provide a data access control device which cross-cuts data into a plurality of data fields and adds an error correcting code to every data field, so as to minimize memory space occupation, permitting memory space to be fully utilized for storing data. A memory access control device according to the present invention comprises a data register connected with a first memory and a second memory for temporary storage of data from the first memory and the second memory; a data processor connected to the data register; a control logic circuit for controlling and driving the data processor to cross-cut data in the data register into a plurality of data fields; an encoder controlled by the control logic circuit to add a respective error correcting code to every data field in the data register; at least one error correcting code recorder for temporary storage of the error correcting code from the encoder; a decoder controlled by the control logic circuit to decode the added error correcting code at every data field in the data register, and to temporarily store the decoded error correcting code in the at least one error correcting code recorder; and an error correcting logic circuit connected between the at least one error correcting code recorder and the data processor, and controlled by the control logic circuit to check the error correcting code received from a data field through the decoder, and to control the data processor in correcting an incorrect data field. The memory access control method comprises the step of using a data processor to cross-cut a data sector into a plurality of data fields when storing data, then using an encoder to add a respective error correcting code to every data field, and then storing the data and added error correcting code in a memory, and the step of decoding the respective error correcting code when reading data from the memory, then storing the decoded error correcting code in a recorder, and then controlling an error correcting logic circuit to compare the decoded error correcting code, and then controlling the data processor to correct the respective data field if the decoded error correcting code is denied after comparison or controlling the data processor to read the data for output if the decoded error correcting code is confirmed.

DETAILED DESCRIPTION OF THE PREFERRED EMBODIMENT

Figure 1:
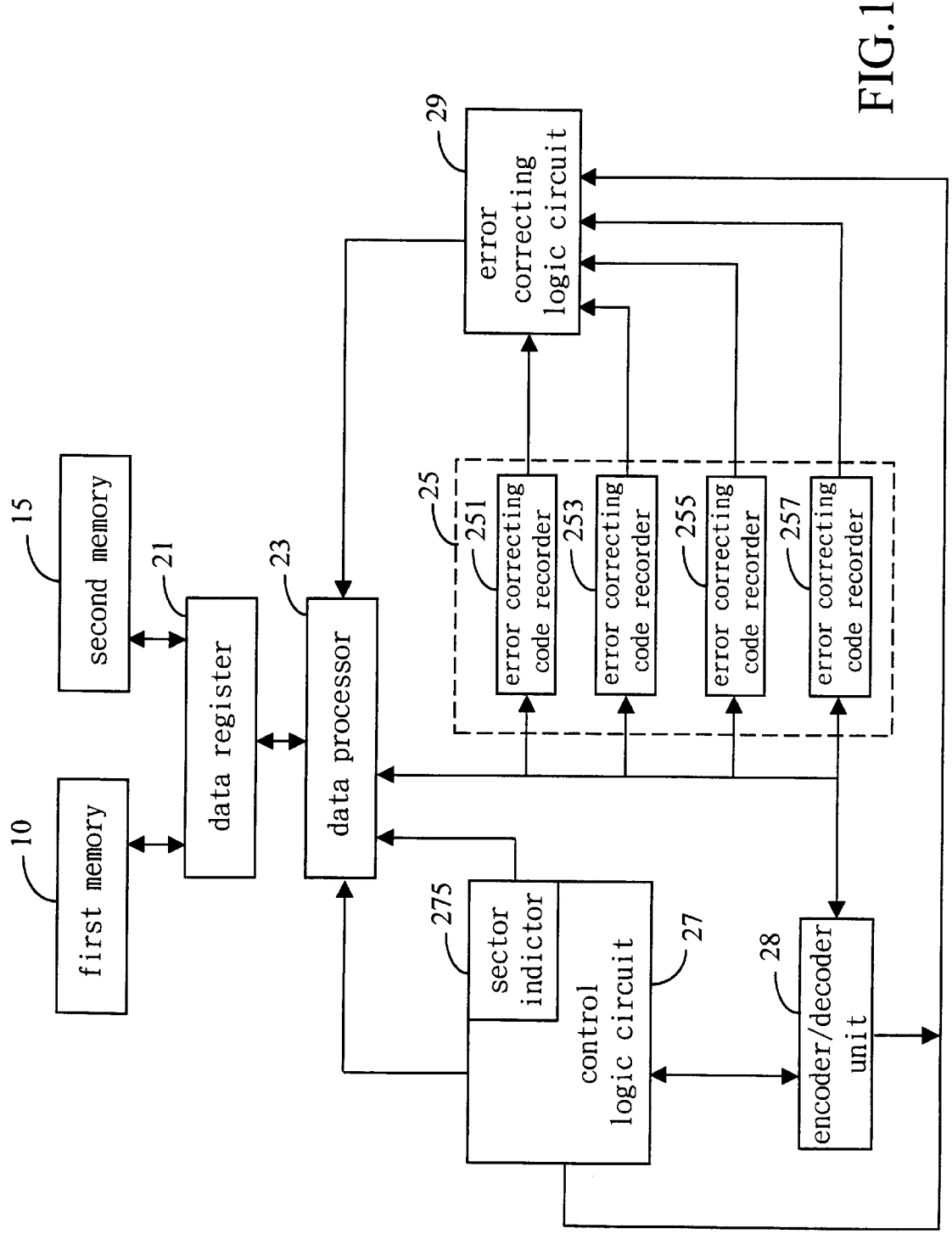
FIG. 1 is a circuit block diagram of a memory access control device according to the present invention.

Referring to FIG. 1, a memory access control device in accordance with the present invention is generally comprised of a data register 21, a data processor 23, a control logic circuit 27, an encoder/decoder unit 28, an error correcting logic circuit 29, and an error correcting code recorder unit 25. The data register 21 is respectively connected to a first memory 10 and a second memory 15 for temporary storage of small amounts of data front the first memory 10 and the second memory 15. The data processor 23 is connected to the data register 21, and controlled by the control logic circuit 27 to cross-cut data in the data register 21 into a plurality of data fields subject to the capacity of its data sector (256 words). The encoder/decoder unit 28 is controlled to generate a respective error correcting code behind every data field by means of Reed-Solomon Code. The error correcting codes are indicated by the sector access indicator 275 in the control logic circuit 27 to associate then with the corresponding data fields, and temporarily stored in the error correcting recorders 251–257 of the error correcting code recorder unit 25. Through the operation of the data processor 23, the error correcting codes can be added to the corresponding data fields, and stored in, for example, the second memory 15. When reading data from the second memory 15, the encoder/decoder unit 28 is controlled by the control logic unit 27 to decode the error correcting code at each data field, and then to store the decoded code in the error correcting code recorder unit 25. By means of the scanning operation of the error correcting logic circuit 29, the error correcting code at storage of data is compared with an error correcting code generate at reading of data, and the data processor 23 is controlled by the error correcting logic circuit 29 to correct the incorrect data field when a negative comparison result is shown, and then to output data to the first memory 10 for reading. By means of the aforesaid scanning and correcting procedure, the data access reliability is greatly improved.

Figure 2:
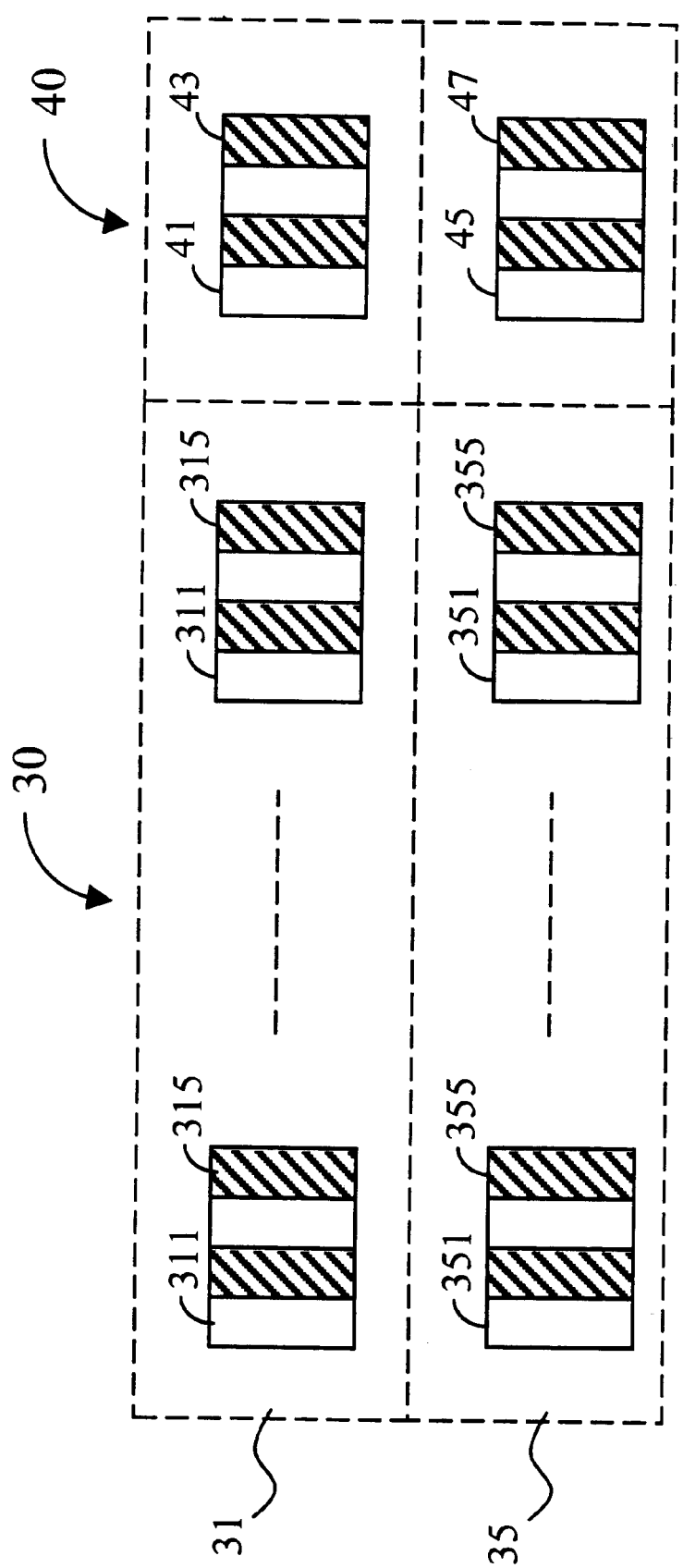
FIG. 2 is a schematic drawing of a data sector after storage of coded data.

Referring to FIG. 2, the data sector (capacity of 256 words) 30 is divided into a high byte portion 31 and a low byte portion 35. The high byte portion 31 and the low byte portion 35 are respectively divided into a zeroth data field 311 or 351, and a first data field 315 or 355. Therefore, every data sector 30 can be subdivided into four blocks (zeroth data field and first data field for each of the high and low bytes) and the relatively increased error correcting codes 41; 43; 45; 47 of the parity byte portion 40 are respectively stored in addresses 257; 258; 259; 260 behind the sector data 30. Therefore, the storage efficiency of the memory is greatly improved. Because, error correction scanning time is shortened, the data access speed of the system is greatly improved.

Figure 3:
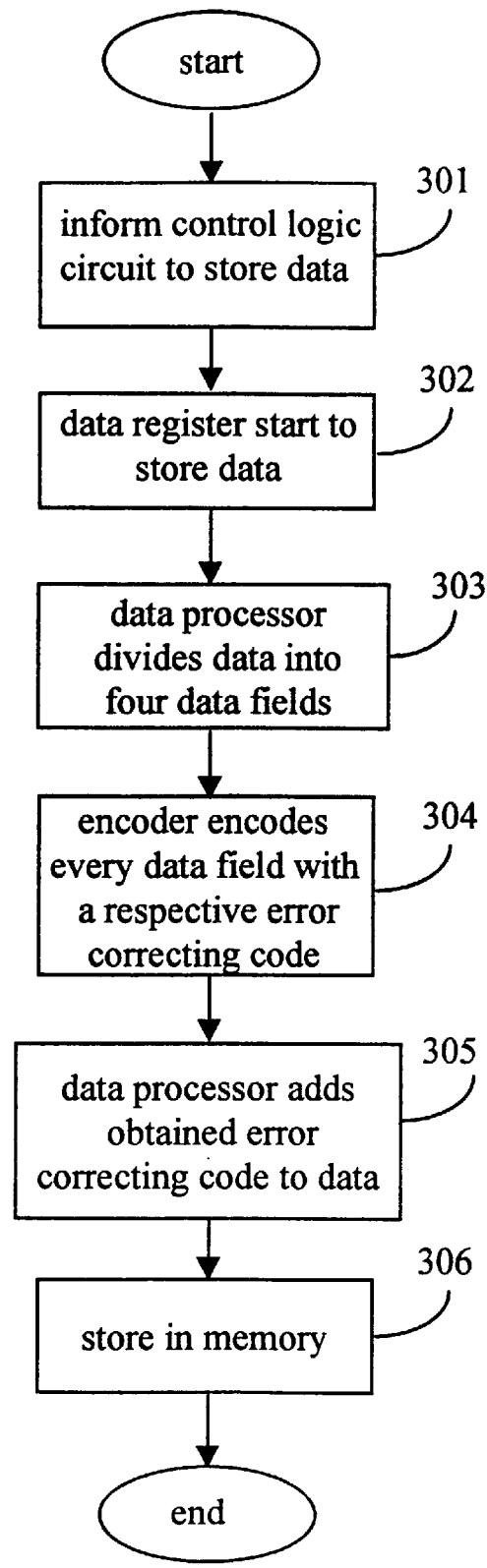
FIG. 3 is a data storage flow chart according to the present invention.

Referring to FIG. 3, the procedure of generating an error correcting code when storing data in the memory comprises;

Step 301, where the control logic circuit receives a data storage message, and informs the data processor to receive data;

Step 302, where the data processor controls the data register to temporarily store data;

Step 303, where the data processor is controlled to cross-cut the data in the data register into a plurality of (four) data fields;

Step 304, where the sector indicator in the control logic circuit points out the address of the data currently processed by the data register and the data processor, and the control logic circuit controls the encoder/decoder unit to generate a respective error correcting code corresponding to each data field, permitting every error correcting code to be temporarily stored in the error correcting code recorder unit;

Step 305, where the data processor adds the error correcting code to data in the data register; and Step 306, where the data and added error correcting code are transferred from the data register to the memory.

Figure 4:
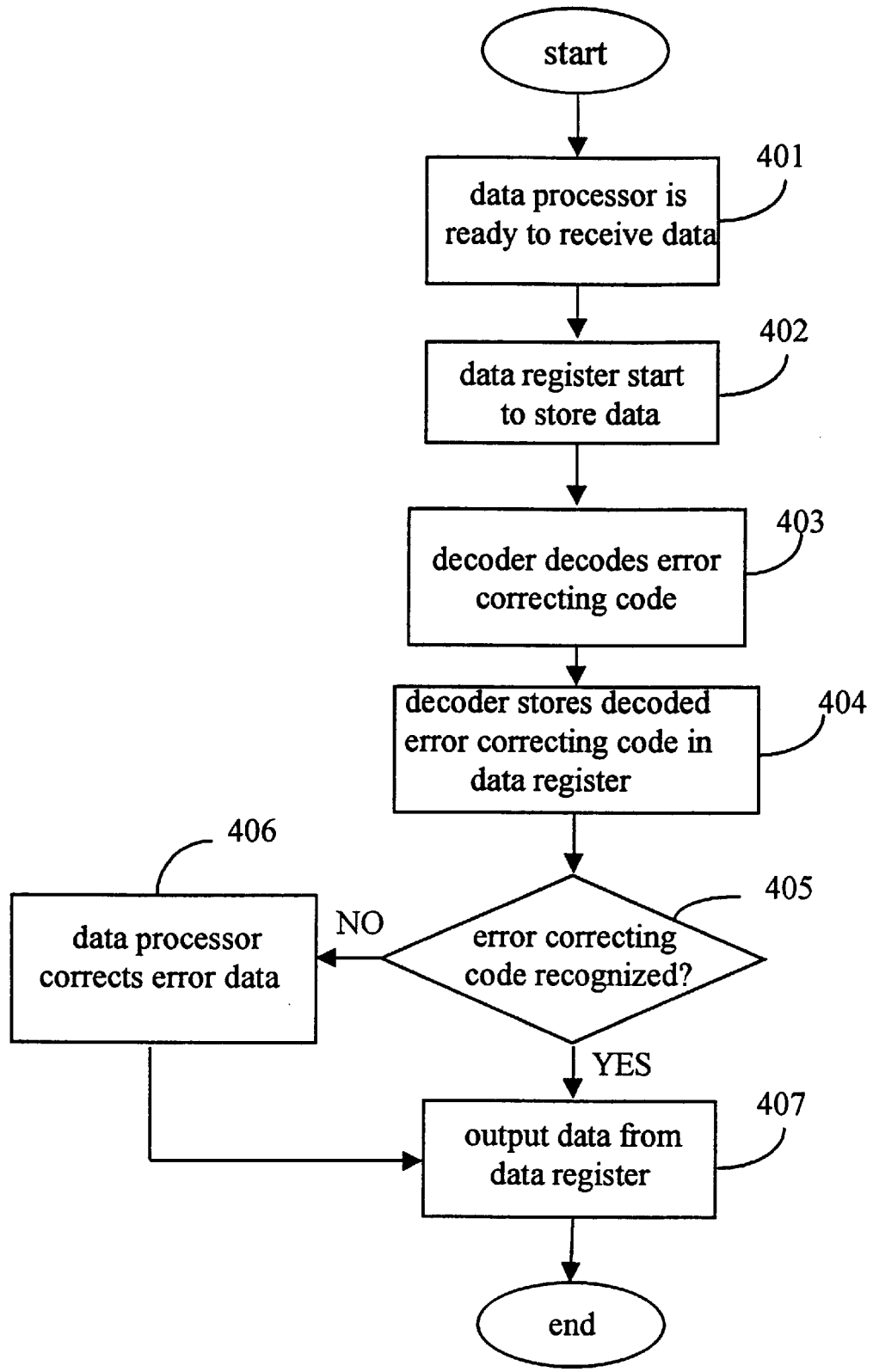
FIG. 4 is a data reading flow charge according to the present invention.

Referring to FIG. 4, the procedure of reading data from the memory comprises:

Step 401, where the control logic circuit receives a data reading message, and informs the data processor to receive data from the memory;

Step 402, where the data processor controls the data register to start receiving data from the memory;

Step 403, where the sector indicator in the control logic circuit points out the address of the data currently processed by the data register and the data processor, and the control logic circuit controls the encoder/decoder unit to decode the error correcting code at the corresponding data field;

step 404, where the decoded error correcting code is temporary stored in the error correcting code recorder unit;

Step 405, where the control logic circuit informs the error correcting logic circuit to compare with the decoded error correcting code, and then the system proceeds to Step 406 when the decoded error correcting code is confirmed, or proceeds to Step 407 if the decoded error correcting code is denied;

Step 406, where the data processor corrects the error data in the corresponding data field, and then proceeds to Step 407;

Step 407, where the data processor outputs the correct data from the data register, and finishes the procedure.

As indicated above, the invention uses an algorithm of Reed-Solomon Code to compile access data with a corresponding error correcting code. Further, the first and second memories can be a flash disk, disk drive, or any storage means for storing data signals.

It is to be understood that the drawings are designed for purposes of illustration only, and are not intended as a definition of the limits and scope of the invention disclosed.

What the invention claimed is:

1. A memory access control device comprising:

a data register connected with a first memory and a second memory for temporary storage of data from said first memory and said second memory;

a data processor connected to said data register;

a control logic circuit for controlling and driving said data processor to subdivide data in said data register into a plurality of data fields;

an encoder controlled by said control logic circuit to add a respective error correcting code to every data field in said data register;

at least one error correcting code recorder for temporary storage of the error correcting codes from said encoder;

a decoder controlled by said control logic circuit to decode the added error correcting code at every data field in said data register, and to temporarily store the decoded error correcting codes in said at least one error correcting code recorder; and an error correcting logic circuit connected between said at least one error correcting code recorder and said data processor, and controlled by said control logic circuit to check the error correcting codes received from said data fields through said decoder, and to control said data processor in correcting an incorrect data field.

2. The memory access control device of claim 1, wherein said control logic circuit comprises a sector indicator connected to said data register and said data processor.

3. The memory access control device of claim 1, wherein said first memory and said second memory are flash disks.

4. The memory access control device of claim 1. wherein said first memory and said second memory are disk drives.

5. The memory access control device of claim 1, wherein said data processor is controlled by said control logic circuit to divide the data in said data register into four sections.

6. The memory access control device of claim 5, wherein said at least one error correcting code recorder includes four error correcting code recorders.

7. A memory access control method comprising the steps of:

(a) using a data processor to subdivide a data sector into a plurality of data fields when storing data;

(b) using an encoder to add a respective error correcting code to every data field;

(c) storing the data and added error correcting codes in a memory;

(d) decoding the respective error correcting code when reading data from the memory, then storing the decoded error correcting code in a recorder;

(e) controlling an error correcting logic circuit to compare the decoded error correcting code;

(f) controlling the data processor to correct the respective data field if the decoded error correcting code is denied after comparison during step (e); and (g) controlling the data processor to read the data for output if the decoded error correcting code is confirmed after comparison during step (e).

8. The memory access control method of claim 7 further comprising the step (a1) of using a sector indicator to point out the data field under processing after the step (a) and before the step (b).

9. The memory access control method of claim 7, wherein the step (a) subdivides the data sector into four data fields.

* * * * *